(12) United States Patent
Jing et al.

(10) Patent No.: US 10,787,582 B2
(45) Date of Patent: Sep. 29, 2020

(54) COMPOSITION, METHOD OF MAKING COMPOSITION, AND ARTICLE

(71) Applicant: 3M INNOVATIVE PROPERTIES COMPANY, St. Paul, MN (US)

(72) Inventors: Naiyong Jing, St. Paul, MN (US); Shupeng Wu, Shanghai (CN); Zhigang Yu, Shanghai (CN); Jiafeng Liu, Denton, TX (US); Mingna Xiong, Shanghai (CN); Xuan Jiang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 16/064,404

(22) PCT Filed: Dec. 25, 2015

(86) PCT No.: PCT/CN2015/098922
§ 371 (c)(1),
(2) Date: Jun. 20, 2018

(87) PCT Pub. No.: WO2017/107185
PCT Pub. Date: Jun. 29, 2017

(65) Prior Publication Data
US 2019/0010341 A1 Jan. 10, 2019

(51) Int. Cl.
| | |
|---|---|
| *B01J 13/04* | (2006.01) |
| *C09D 7/40* | (2018.01) |
| *C08K 9/06* | (2006.01) |
| *C08J 3/12* | (2006.01) |
| *C08J 7/04* | (2020.01) |
| *C09D 5/33* | (2006.01) |
| *C08K 5/544* | (2006.01) |
| *C08K 5/5415* | (2006.01) |
| *C08K 5/5419* | (2006.01) |
| *C08K 5/5425* | (2006.01) |
| *C08K 3/36* | (2006.01) |

(52) U.S. Cl.
CPC ............... *C09D 7/70* (2018.01); *B01J 13/04* (2013.01); *C08J 3/128* (2013.01); *C08J 7/0427* (2020.01); *C08K 9/06* (2013.01); *C09D 5/004* (2013.01); *C09D 7/67* (2018.01); *C08J 2333/00* (2013.01); *C08J 2375/04* (2013.01); *C08J 2383/07* (2013.01); *C08J 2433/00* (2013.01); *C08J 2475/04* (2013.01); *C08K 3/36* (2013.01); *C08K 5/544* (2013.01); *C08K 5/5415* (2013.01); *C08K 5/5419* (2013.01); *C08K 5/5425* (2013.01); *C08K 2201/005* (2013.01); *C08K 2201/011* (2013.01)

(58) Field of Classification Search
CPC .......... C08J 2383/07; B01J 13/04; C09D 7/70
USPC ........................................................ 524/588
See application file for complete search history.

(56) References Cited

U.S. PATENT DOCUMENTS

| | | | |
|---|---|---|---|
| 4,806,665 A | 2/1989 | Jones et al. | |
| 5,939,471 A | 8/1999 | Watanabe et al. | |
| 6,184,408 B1 * | 2/2001 | Burns ................... | C01B 33/193 524/403 |
| 8,633,263 B2 | 1/2014 | Jing et al. | |
| 2001/0051213 A1 | 12/2001 | Schulz et al. | |
| 2002/0090519 A1 | 7/2002 | Kursawe et al. | |
| 2002/0197551 A1 * | 12/2002 | Tazawa ................ | G03G 9/0825 430/108.7 |
| 2006/0120941 A1 | 6/2006 | Chen et al. | |
| 2013/0225760 A1 | 8/2013 | Jing et al. | |
| 2013/0287856 A1 * | 10/2013 | Caprasse .............. | A61K 9/5031 424/490 |

FOREIGN PATENT DOCUMENTS

| | | |
|---|---|---|
| CN | 1898345 A | 1/2007 |
| JP | 2001-106791 | 4/2001 |
| JP | 2009-196829 | 9/2009 |
| WO | WO 2008-028640 | 3/2008 |
| WO | WO 2010-114700 | 10/2010 |
| WO | WO 2012-045204 | 4/2012 |

OTHER PUBLICATIONS

Min, S.K., et al., "Characterizations of Modified Silica Nanoparticles (I)", Kor.J.Mater.Res. (2012), vol. 22, No. 6; pp. 275-279.
Supplementary European Search Report for EP 15911183.0, dated Jun. 26, 2019, 2 pp.
Koppel, "Analysis of macromolecular polydispersity in intensity correlation spectroscopy :The method of cumulants", Dec. 1972, The journal of chemical physics, vol. 57, No. 11,pp. 4814-4820.
International Search report for PCT International Appl. No. PCT/CN2015/098922 dated Jun. 28, 2016, 5 pages.

* cited by examiner

*Primary Examiner* — Margaret G Moore
(74) *Attorney, Agent, or Firm* — Janet A. Kling

(57) ABSTRACT

A composition having pH of 5 or less comprises composite particles dispersed in an aqueous continuous liquid phase. Each composite particle comprises a polymer core surrounded by a siliceous shell. From 3 to 50 percent of silicon atoms in the siliceous shells are bonded to respective organic groups via a silicon-carbon covalent bond. The weight ratio of the total amount of the silica in the composition to the total amount of the at least one polymer is from 0.1 to 19. The composition is useful for making various articles. A method for making the composition is also disclosed. Siliceous particles dispersed in an aqueous phase, wherein from 3 to 50 percent of silicon atoms in the siliceous particles are bonded to organic groups via a silicon-carbon covalent bond are also disclosed.

9 Claims, 1 Drawing Sheet

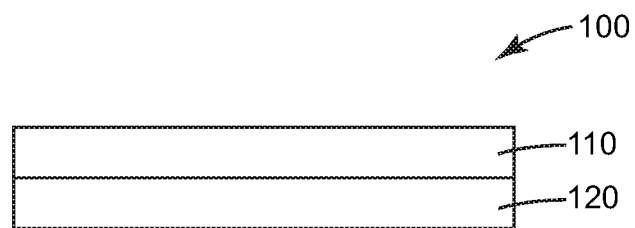

COMPOSITION, METHOD OF MAKING COMPOSITION, AND ARTICLE

TECHNICAL FIELD

The present disclosure broadly relates to compositions useful for coating a substrate, methods of making them, and articles made therefrom.

BACKGROUND

There have been many efforts to develop compositions that can be applied to substrates to provide a beneficial protective or functional layer with desirable properties such as one or more of easy cleaning, stain prevention, antireflection, and the like. Many compositions developed for such applications rely on materials (for example, volatile organic solvents) that can present environmental issues and/or involve complex application processes. Further, problems relating to inadequate shelf-life continue to plague product developers of such compositions.

For articles that include a window of transparent material (e.g., glass or plastic) through which light must pass, any reflection or blockage of incident light transmitted through the transparent sheet is generally undesirable. During assembly of such articles, residue from adhesives and/or sealants used in fabrication of the article can build up on the window, leading to reduced light transmission through it. Accordingly, it is desirable that the window be made durable, anti-reflective, stain/soil-resistant (antisoiling), and easy to clean, especially with respect to removing/avoiding buildup of adhesive residue.

SUMMARY

Advantageously, compositions according to the present disclosure provide long lasting useful levels of cleanability, soil-resistance, durability, and/or anti-reflectance properties when applied to substrates having a hard surface. In one preferred embodiment, the substrate comprises a photovoltaic cell. Moreover, the compositions may be formulated to contain little or no volatile organic solvents, are typically easy to apply, and may exhibit extended shelf stability.

Additionally, the compositions may exhibit excellent release properties with respect to adhesives and sealants (e.g., acrylic pressure-sensitive adhesives and ethylene-vinyl acetate (EVA) adhesives and sealants) that they come into contact with.

In one aspect, the present disclosure provides a composition comprising:
  an aqueous continuous liquid phase;
  composite particles dispersed in the aqueous continuous liquid phase, each composite particle comprising:
    a polymer core comprising at least one polymer,
    a silicaceous shell surrounding and disposed on the polymer core, wherein from 3 to 50 percent of silicon atoms in the silicaceous shell are bonded to respective organic groups via a silicon-carbon covalent bond, and wherein the weight ratio of a total amount of the silica in the composition to the total amount of the at least one polymer is from 0.1 to 19, and
  wherein the composition has a pH of 5 or less.

Compositions according to the present disclosure are useful; for example, for making coated articles.

Accordingly, in another aspect, the present disclosure provides a method of making an article, the method comprising applying a composition according to the present disclosure to a surface of a substrate, and at least partially drying the composition. In yet another aspect, the present disclosure provides an article made by the method.

In yet another aspect, the present disclosure provides a method of making a composition comprising steps:
  a) providing a dispersion of organo-modified silica particles and polymer particles in an aqueous continuous liquid phase having an alkaline pH, wherein the organo-modified silica particles have an average particle diameter of less than 20 and nanometers: and
  b) acidifying the dispersion to a pH of less than or equal to 5, thereby causing deposition of at least the organo-modified silica particles onto the polymer particles to provide composite particles dispersed in the aqueous continuous liquid phase, each composite particle comprising:
    a polymer core comprising at least one polymer,
    a silicaceous shell surrounding and disposed on the polymer core, wherein from 3 to 50 percent of silicon atoms in the silicaceous shell are bonded to organic groups via a silicon-carbon covalent bond, and wherein the weight ratio of a total amount of the silica in the composition to the total amount of the at least one polymer is from 0.1 to 19.

In yet another aspect, the present disclosure provides the present disclosure provides a composition comprising:
  a continuous liquid phase comprising at least 90 percent by weight of water; and
  organo-modified silica particles dispersed in the aqueous continuous liquid phase, wherein from 3 to 50 percent of silicon atoms in the silicaceous particles are bonded to organic groups via a silicon-carbon covalent bond.

As used herein:
  the term "aqueous" means containing at least 5 weight percent of water;
  the term "polyurethane" includes any polymeric material that has at least one polyurethane segment; and
  the term "polyurethane segment" refers to at least two urethane and/or urea groups that are connected by an organic group.

Features and advantages of the present disclosure will be further understood upon consideration of the detailed description as well as the appended claims.

BRIEF DESCRIPTION OF THE DRAWINGS

FIG. 1 is a schematic side view of an article 100 made according to the present disclosure.

It should be understood that numerous other modifications and embodiments can be devised by those skilled in the art, which fall within the scope and spirit of the principles of the disclosure.

DETAILED DESCRIPTION

Compositions according to the present disclosure comprise an aqueous continuous liquid phase having composite particles dispersed therein.

The aqueous continuous liquid phase comprises at least 5 percent by weight of water; for example, the aqueous continuous liquid phase may comprise at least 50, 60, 70, 80, or 90 percent by weight of water, or more. While the aqueous continuous liquid phase is preferably essentially free of (that is, contains less than 10 percent by weight of based on the total weight of the aqueous continuous liquid phase) organic solvents, especially volatile organic solvents, organic solvents may optionally be included in a minor amount if desired. If present, the organic solvents should preferably be water-miscible, or at least water-soluble in the amounts in which they are used, although this is not a requirement. Examples of organic solvents include acetone and lower molecular weight ethers and/or alcohols such as methanol, ethanol, isopropanol, n-propanol, glycerin, ethylene glycol, triethylene glycol, propylene glycol, ethylene or propylene glycol monomethyl or monoethyl ether, diethylene or dipropylene glycol methyl or ethyl ether, ethylene or propylene glycol dimethyl ether, and triethylene or tripropylene glycol monomethyl or monoethyl ether, n-butanol, isobutanol, sec-butanol, tert-butanol, and methyl acetate.

It will be recognized that some organic solvent (e.g., ethanol or methanol) will typically be generated in situ during hydrolysis of the organosilicates. This amount is not included by the term "added solvent" in the preceding paragraph. In general, this amount, which may be removed if desired, is less than 10 percent by weight, preferably less than 7 percent by weight.

Each of the composite particles comprises a polymer core surrounded by a silicaceous shell disposed on the polymer core. As used herein, the term "shell" refers to an assembly of silica particles disposed on and covering (e.g., densely covering) the surface of a polymer core. In preferred embodiments, the silicaceous shell comprises organo-modified silica particles, preferably nonporous and spherical.

The organo-modified silica particles may optionally be covalently bonded one to another in the composition, but this is typically not preferred. However, once applied to a substrate and dried, it is preferred that the silica particles form covalent bonds that link them one to another (e.g., by acid sintering), and optionally to the substrate.

Preferably, the polymer core is non-cationic; however, this is not a requirement. By the term "non-cationic polymer core", it is meant that core is free of polymers having a permanently positively charged group such as, for example, tetraalkylammonium, pyridinium, guanidinium, or quaternary phosphonium. Protonated groups that readily dissociate in water (e.g., in response to the pH) may be included in the polymer core; however, in many embodiments they are not. The polymer core comprises at least one polymer.

The polymer core may comprise any polymer, typically one that can be prepared as a latex, more typically as an alkaline pH stable latex. Typically, the polymer core comprises one or more water-insoluble polymers, although this is not a requirement. Exemplary polymers include acrylic polymers, styrenic polymers, vinyl acetate-ethylene copolymers, polyvinyl acetate, styrene-butadiene rubbers, polyurethanes (including urethane-acrylic polymers), polyesters, and polyamides. Preferably, the polymer is a film-forming polymer. The polymer may be thermosetting or thermoplastic. Preferably, the polymer comprises a polyurethane segment as in the case of a polyurethane or a urethane-acrylic polymer (which typically has polyurethane and polyacrylic segments). Suitable polymer latexes and methods for making them are widely known in the art, and many are commercially available.

Examples of commercially available polymer latexes include acrylic emulsion polymers available as NEOCRYL A612 and NEOCRYL A1049 from DSM Neoresins, Wilmington, Mass. and 3M FAST TACK 1000NF acrylic emulsion from 3M Company, Saint. Paul, Minn.; aqueous aliphatic polyurethane emulsions available as NEOREZ R-960, NEOREZ R-966, NEOREZ R-967, NEOREZ R-9036, and NEOREZ R-9699 from DSM NeoResins, Inc., Wilmington, Mass.; aqueous anionic polyurethane dispersions available as ESSENTIAL CC4520, ESSENTIAL CC4560, ESSENTIAL R4100, and ESSENTIAL R4188 from Essential Industries, Inc., Merton, Wis.; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; an aqueous anionic, co-solvent free, aliphatic self-crosslinking polyurethane dispersion, available as BAYHYDROL PR240 from Bayer Material Science, LLC of Pittsburgh, Pa.; and a carboxylated styrene-butadiene (SBR) latex emulsion available as ROVENE 5044 from Mallard Creek Polymers, Inc., Charlotte, N.C.

Combinations of polymers may be included in the polymer core. For example, an individual polymer core may comprise two or more polymers. Further, the composition may contain two types of polymer cores, each comprising a different type of polymer, for example, as would be obtained by mixing an acrylic latex and a polyurethane latex. Typically, the particles in the polymer latexes are substantially spherical in shape, although this is not a requirement.

Optionally, the composition may further comprise one or more water-soluble polymers which may be present in the core and/or dissolved or dispersed in the aqueous continuous liquid phase exclusive of the composite particles. Examples include polyvinyl alcohols (e.g., of varying degree of hydrolysis), polyacrylamides, polyvinylpyrrolidone, polyethyleneimine, hydroxyethylcellulose, polyalkylene oxides (e.g., polyethylene oxide, polypropylene oxide), and polyvinyl methyl ether and its copolymers with maleic anhydride. Preferably the water-soluble polymer is free of permanently charged groups.

Useful polymer particle sizes include those typical of latexes and other dispersions or emulsions. Typical polymer particle sizes are in a range of from about 5 to 250 nm, more preferably 10 to 70 nm, more preferably 10 to 50 nm, and even more preferably 20 to 50 nm, although this is not a requirement.

The silicaceous shell may comprise, preferably consist essentially of (i.e., contain at least at least 95 wt. %), or even be composed entirely of, organo-modified silica particles having a mean particle diameter of 100 nm or less. In some preferred embodiments, the silica particles have a mean particle diameter of from 0.8 to 15 nm, more preferably 0.8 to 10 nm, more preferably 0.8 to 5 nm, and even more preferably 0.8 to 3 nm. Preferably, the organo-modified silica particles are monodisperse, with substantially the same size and shape. In some embodiments, the organo-modified silica particles may be individually bound (e.g., reversibly bound) to the polymer core. In some subsequent embodiments, some or all of the organo-modified silica particles can be bonded to other organo-modified silica particles (e.g., by acid sintering, multivalent metal ion cross-linking). In cases where the polymer core is subsequently burned out, the silicaceous shell may become heat sintered.

The organo-modified silica particles can be prepared, for example, by hydrolysis and condensation of a hydrolyzable organosilicate (e.g., tetraethoxysilane (TEOS) or tetramethoxysilane (TMOS)) in the presence of hydrolyzable organosilane represented by Formula I:

$$R^1Si(OR^2)_3 \qquad (I)$$

$R^1$ represents a monovalent organic group, preferably having from 1 to 18 carbon atoms. $R^1$ may include aromatic and/or aliphatic moieties. Preferred the organic groups $R^1$ include alkyl groups having from 1 to 4 carbon atoms (e.g., methyl, ethyl, propyl, butyl), chloromethyl, 3-chloropropyl, epoxyalkyl and epoxyalkyleneoxyalkyl groups having from 1 to 6 carbon atoms (e.g., 3-glycidyl, 3-glycidoxypropyl, 3-glycidoxyprop-2-yl, 3-glycidoxyethyl, and oxiranyl), alkenyl groups having from 1 to 6 carbon atoms (e.g., vinyl, allyl, and phenyl), trialkylammonioalkyl having from 5 to 30 carbon atoms (e.g., trimethylammoniopropyl), carboxyalkyl having from 3 to 8 carbon atoms (e.g., carboxyethyl), sulfonatoalkyl having from 2 to 8 carbon atoms (e.g., sulfonatoethyl), and glucosyl. The foregoing organic groups may optionally be substituted by catenary O, S, P, and/or N atoms.

Each $R^2$ independently represents H, an alkyl group having from 1 to 4 carbon atoms, or an acyl group having from 1 to 4 carbon atoms. Exemplary $R^2$ groups include methyl, ethyl, propyl, butyl, acetyl, and propanoyl. Of these, ethyl and methyl are most preferred.

The above hydrolysis process is analogous to the well-known Stöber process for amine/base-catalyzed hydrolysis of a tetraalkoxyorthosilicate such as tetraethoxysilane or tetramethoxyorthosilicate. Exemplary amines/bases include alkylamines having from 1 to 4 carbon atoms (e.g., methylamine, ethylamine, dimethylamine, propylamine, butylamine), alkanolamines (e.g., ethanolamine, propanolamine), and ammonia. Further details are given in the Examples described hereinbelow. See also U.S. Pat. No. 4,806,665 (Jones et al.).

Mean particle size can be determined using Dynamic Light Scattering (also known as Photon Correlation Spectroscopy). Various commercial instruments are available. One preferred instrument is available as a ZETASIZER NANO ZS from Malvern Instruments, Malvern, United Kingdom, used according to the manufacturer's instructions and with its accompanying software.

The weight ratio of the total amount of the silica in the silicaceous shell, corresponding to the theoretical amount of $SiO_2$ prior to any pyrolysis to remove organic groups, in the composition to the total amount of the at least one polymer in the polymer core is in a range of 0.1 to 19, preferably 0.2 to 19, more preferably 0.4 to 19, more preferably 0.5 to 1.8, more preferably 0.6 to 1.6, and even more preferably 0.7 to 1.3.

Composite particles according to the present disclosure preferably have an average particle size of from 60 to 250 nm, more preferably 60 to 150 nm, although other average particle sizes are also acceptable.

Compositions according to the present disclosure have a pH of 5 or less, preferably 4 or less, 3 or less, or even 2 or less. As is known in the art, the pH of aqueous compositions may be adjusted, for example, by addition of acid and/or base.

The composition may have a wide range of non-volatile solids content. For example, it may have a solids content of from 0.1 to 15 percent by weight, or more. Preferably the solids contents is from 2 to 10 percent by weight, more preferably from 3 to 8 percent by weight.

Optionally, the composition may further comprise at least one of an organic orthosilicate or a partially hydrolyzed oligomer thereof. Exemplary organosilicates include, tetramethoxysilane (TMOS) and tetraethoxysilane (TEOS). The organosilicate may be present as a hydrolyzed oligomer as it exists in the composition.

Optionally, but preferably, the composition may further comprise additional hydrolyzable organosilane according to Formula I, hereinabove. This additional hydrolyzable organosilane is added to the composition with mixing after the composite particles have been formed, and may be present as free material and/or as a reaction product with the composite particles (e.g., on at least a portion of their respective silicaceous surfaces). If present, this additional hydrolyzable organosilane, preferably a water-soluble hydrolyzable organosilane, is preferably added in an amount of 1 to 10 percent by weight, more preferably 4 to 7 percent by weight, of the total weight of the resulting composition. Unexpectedly, it is presently discovered that inclusion of additional hydrolyzable organosilane as described above increases storage stability of the compositions.

In some embodiments, the composition further comprises a metal cation having a positive charge of at least +2 charge (i.e., a polyvalent metal cation). In some embodiments, the charge of the metal cation is at least +3. Exemplary suitable metal cations include those provided by dissolving salts of polyvalent metals such as aluminum (+3), titanium (+4), vanadium (+3, +4, +5), manganese (+2, +3), zinc (+2), and tin (+2, +4) in the aqueous vehicle. In some preferred embodiments these metal cations comprise aluminum (+3) cations). If a polyvalent metal cation is included in the composition, it is preferably present in an amount of from 0.1 to 5 percent by weight, more preferably 0.5 to 3 percent by weight based on the total weight of the composition, although other amounts may also be used.

Compositions according to the present disclosure may optionally include at least one surfactant. The term "surfactant" as used herein describes molecules with hydrophilic (polar) and hydrophobic (non-polar) segments on the same molecule, and which are capable of reducing the surface tension of the composition. Examples of useful surfactants include: anionic surfactants such as sodium dodecylbenzenesulfonate, dioctyl ester of sodium sulfosuccinic acid, polyethoxylated alkyl ($C_{12}$) ether sulfate, ammonium salt, and salts of aliphatic hydrogen sulfates; cationic surfactants such as alkyldimethylbenzylammonium chlorides and di-tallowdimethylammonium chloride; nonionic surfactants such as block copolymers of polyethylene glycol and polypropylene glycol, polyoxyethylene (7) lauryl ether, polyoxyethylene (9) lauryl ether, and polyoxyethylene (18) lauryl ether; polysorbate 20 (e.g., TWEEN 20 from surfactants from Croda, Edison, N.J.), polysorbate 80 (e.g., TWEEN 80 from Croda) and amphoteric surfactants such as N-cocoaminopropionic acid. Silicone and fluorochemical surfactants such as those available under the trade designation FLUORAD from 3M Company, St. Paul, Minn., may also be used. If present, the amount of surfactant typically is in an amount of less than about 0.1 percent by weight of the composition, preferably between about 0.003 and 0.05 percent by weight of the composition.

The composition may also optionally contain an antimicrobial agent. Many antimicrobial agents are commercially available. Examples include those available as: Kathon CG or LX available from Rohm and Haas Co., Philadelphia, Pa.; 1,3-dimethylol-5,5-dimethylhydantoin; 2-phenoxyethanol; methyl-p-hydroxybenzoate; propyl-p-hydroxybenzoate; alkyldimethylbenzylammonium chloride; and benzisothiazolinone.

Compositions according to the present disclosure are useful for preparing coatings on substrates, where they may impart one or more useful properties such as stain resistance, antireflection, and/or easy cleaning.

Compositions according to the present disclosure are useful, for example, for coating a substrate. Referring now to FIG. 1, an article 100 comprises a substrate 120 having a layer 110 disposed thereon. Layer 110 is formed by applying a composition according to the present disclosure to a surface of a substrate and at least partially removing the aqueous continuous liquid phase from the composition.

Suitable substrates may include, for example, glass (for example, windows (including architectural and motor vehicle windows) and optical elements such as, for example, lenses, filters, and mirrors), electronic display windows, solar panels (typically, on solar glass), ceramic (for example, ceramic tile), cement, stone, painted and/or clearcoat surfaces (for example, automobile or truck body or closure panels, boat surfaces, motorcycle parts, truck tractors, snowmobiles, jet skis, off-road vehicles, and tractor trailers), appliances, signage, plastic protective films which are backed with pressure-sensitive adhesives, metal (for example, architectural columns, plumbing fixtures), fiberglass, thermosetting polymers, sheet molding compound, thermoplastics (for example, polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof.

Compositions according to the present disclosure can be prepared by various techniques. In one such technique, an aqueous dispersion of the organo-modified silica particles is mixed with a polymer latex while maintaining an alkaline pH (preferably a pH of 7 to 10). Simple mixing is generally effective for this step. Next, the composition is acidified with acid thereby causing the organo-modified silica particles to deposit as a shell (preferably, a monolayer shell) on the surfaces of the polymer latex particles. This deposition of silica particles is preferably reversible by adjusting the pH back above about 7. Typically, the resulting composite particles are particularly stable at low pH values (e.g., a pH of 1 to 4).

In an alternative method, an organosilicate (e.g., TMOS or TEOS), an organosilane (e.g., having the formula $R^1$—Si$(OR^2)_3$ as described hereinabove) and the latex can be mixed together and the mixture hydrolyzed under alkaline conditions (e.g., using ammonia or an amine). Acidification of the hydrolyzed mixture causes the organo-modified silica particles, optionally in the presence of non-modified silica particles, to deposit as a silicaceous shell (preferably, a monolayer shell) on the surface of each polymer latex particles as described above.

To achieve shell formation the organo-modified silica particles should typically be smaller than the polymer core, although this is not a requirement. For example, the mean particle diameter ($D_{50}$) of the polymer core may be on the order of at least 3 times greater than the mean particle diameter ($D_{50}$) of the organo-modified silica particles. More typically, the mean particle diameter of the polymer core should typically be on the order of at least 5 times, at least 10 times, or even at least 50 times greater than the mean particle diameter of the organo-modified silica particles.

For typical polymer core sizes, the weight ratio of the silica particles (collectively referring to the organo-modified silica particles and optional non-modified silica particles that may be present) to the polymer latex particles used in manufacture of the composite particles is in a range of from 30:70 to 95:5, preferably 50:50 to 95:5, and more preferably 60:40 to 90:10. Without wishing to be bound by theory, it is believed that during gradual acidification of such a dispersion of polymer particles (for example, latex particles) and silica particles in the aqueous liquid vehicle, the silica particles deposit on the surface of the polymer latex particles, eventually in sufficient quantity to form a silicaceous shell (typically at least a monolayer of the silica particles) that serves to stabilize the dispersion and reduce or prevent agglomeration and precipitation of the polymer particles. It is further believed that upon addition of base to raise the pH that the silica particles dissociate from the polymer latex particles and regenerate a mixture of the two types of particles.

Preferably, the silicaceous shell is free of other particulate matter and/or silica particles.

In some embodiments, compositions according to the present disclosure are purified at some point in their manufacture to remove ammonium, quaternary ammonium, and/or metal cations (e.g., alkali metal cations such as sodium and potassium) that may be present. This may be done by any suitable method such as, for example, by contacting the composition with an ion exchange (i.e., with protons) resin. If it is desired to include a polyvalent metal cation in the composition, then such purification should be carried out prior to addition of the polyvalent metal cation.

In addition, to facilitate coating, coating compositions according to the present disclosure have a pH of less than 5, preferably less than 4, and more still preferably less than 3. To facilitate handling, the coating compositions preferably have a pH of at least 1, more preferably at least 2. In some embodiments, for example, those involving an acid sensitive substrate, it may be preferable to adjust the pH to a value of from about 5 to about 7.5, although this may tend to disrupt the core-shell particle structure.

The compositions may be acidified to the desired pH level with an acid having a $pK_a$ of less than 5, preferably less than 2.5, and more preferably less than 1. Useful acids include both organic and inorganic acids such as, for example, oxalic acid, citric acid, benzoic acid, acetic acid, methoxyacetic acid, formic acid, propionic acid, benzenesulfonic acid, $H_2SO_3$, $H_3PO_4$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. Preferred acids include HCl, $H_2SO_4$, $HNO_3$ and $H_3PO_4$. Combinations of organic and inorganic acids may also be used. Using weaker acids having a $pK_a$ of greater than 5 may not result in a uniform coating having the desirable properties such as transmissivity, cleanability and/or durability.

Compositions according to the present disclosure may be made by any suitable mixing technique. One useful technique includes combining an alkaline polymer latex with an alkaline spherical silica sol of appropriate particle size, and then adjusting the pH to the final desired level.

In some embodiments, the compositions are free of various impurities including nonspherical silica particles, porous silica particles, and added crosslinkers (for example, polyaziridines or orthosilicates). Accordingly, compositions according to the present disclosure may contain less than 0.1 weight percent or less than 0.01 weight percent of acicular silica particles, and, if desired, they may be free of acicular silica particles.

In some embodiments, compositions according to the present disclosure, when coated on a substrate and at least partially dried, provide improved cleanability by way of a reduced tendency to accumulate dirt and other contaminants. By "cleanable" it is meant that compositions according to the present disclosure, when dried and cured, provide a coating which is easier to clean by contacting with flowing water or a water spray to readily displace overlying contamination, thereby removing a substantial portion of the contamination from the coating. The water sheeting effect allows road spray, snow, slush dirt, soap scum, and staining minerals in rainwater and rinse water to substantially sheet out and run off the substrate surface, which significantly reduces the amount and the localized concentration of contaminants that are deposited after the water dries.

In some embodiments, the composition provides an abrasion resistant layer that helps protect the substrate from damage from causes such as scratches, abrasion, and solvents.

The compositions are preferably coated on the article using conventional coating techniques, such as brush, bar, roll, wipe, curtain, rotogravure, spray, or dip coating techniques. For ease and simplicity, a preferred method is to wipe the coating formulation on using a suitable woven or nonwoven cloth, sponge, or foam. Such application materials are preferably acid-resistant and may be hydrophilic or hydrophobic in nature, preferably hydrophilic. Another method to control final thickness and resultant appearance is to apply the coating using any suitable method and, after allowing a portion of the solvent to evaporate, to rinse off excess composition with a stream of water, while the substrate is still fully or substantially wetted with the composition.

Compositions according to the present disclosure are preferably applied to a substrate in a uniform average wet thickness varying from 0.5 to 50 micrometers, and more preferably 1 to 10 micrometer, in order to avoid visible interference color variations in the coating, although other thicknesses may also be used.

The optimal average dry coating thickness is dependent upon the particular composition that is coated, but in general the average thickness of the composition coating thickness is between 0.05 to 5 micrometers, preferably 0.05 to 1 micrometer; for example, as estimated from atomic force microscopy and/or surface profilometry. Above this range, the dry coating thickness variations typically cause optical interference effects, leading to visible iridescence (rainbow effect) of the dried coating which is particularly apparent on darker substrates. Below this range the dry coating thickness may be inadequate to confer sufficient durability for most coatings exposed to environmental wear.

After coating the surface of the substrate, the resultant article is typically dried at ambient or warm temperatures without the need for high temperature heat, radiation or other curing method. Although higher temperature may increase the speed of the drying process, such temperatures are usually not practical or convenient and care must be exercised to avoid damage to the substrate.

In some preferred embodiments, the coatings are heated (e.g., baked) to a sufficiently high temperature (e.g., at least 350 to 750° C.) to cause burn out of the polymer cores, leaving behind the hollow silica shells. Coatings on solar glass (i.e., cover glass affixed to and protecting a photovoltaic cell) resulting from such burn out exhibit excellent antireflective properties and improved light transmission of several percent across the useful 380-1100 nm wavelength range.

Preferably, compositions according to the present disclosure are stable when stored in liquid form; for example, they do not gel, opacify, form precipitated or agglomerated particulates, or otherwise deteriorate significantly.

Select Embodiments of the Present Disclosure

In a first aspect, the present disclosure provides a composition comprising:
an aqueous continuous liquid phase;
composite particles dispersed in the aqueous continuous liquid phase, each composite particle comprising:
a polymer core comprising at least one polymer,
a siliceous shell surrounding and disposed on the polymer core, wherein from 3 to 50 percent of silicon atoms in the siliceous shell are bonded to respective organic groups via a silicon-carbon covalent bond, and wherein the weight ratio of a total amount of the silica in the composition to the total amount of the at least one polymer is from 0.6 to 19, and
wherein the composition has a pH of 5 or less.

In a second embodiment, the present disclosure provides a composition according to the first embodiment, wherein the organic groups comprise at least one of an alkyl group having from 1 to 4 carbon atoms, a chloromethyl group, an epoxyalkyl group having from 1 to 6 carbon atoms, an epoxyalkyleneoxyalkyl group having from 1 to 6 carbon atoms, an alkenyl group having from 1 to 6 carbon atoms, and a combination thereof.

In a third embodiment, the present disclosure provides a composition according to the first or second embodiment, wherein the composition further comprises a water-soluble polymer.

In a fourth embodiment, the present disclosure provides a composition according to any one of the first to third embodiments, wherein the water-soluble polymer is at least partially disposed within the polymer core.

In a fifth embodiment, the present disclosure provides a composition according to any one of the first to fourth embodiments, wherein the composition further comprises from 1 to 10 percent by weight of a hydrolyzable silane represented by the formula:

$$R^1Si(OR^2)_3$$

wherein
$R^1$ represents a monovalent organic group; and
each $R^2$ independently represents H, an alkyl group having from 1 to 4 carbon atoms, or an acyl group having from 1 to 4 carbon atoms.

In a sixth embodiment, the present disclosure provides a composition according to any one of the first to fifth embodiments, wherein the composition further comprises at least one metal cation having a charge of at least +2.

In a seventh embodiment, the present disclosure provides a composition according to sixth embodiment, wherein said at least one metal cation comprises an aluminum cation.

In an eighth embodiment, the present disclosure provides a method of making an article, the method comprising applying the composition of any one of the first to seventh embodiments, to a surface of a substrate, and at least partially drying the composition.

In a ninth embodiment, the present disclosure provides a method according to the eighth embodiment, further comprising heating the at least partially dried composition to a temperature sufficient to burn out the polymer cores of at least a portion of the composite particles, leaving behind the corresponding hollow silica shells.

In a tenth embodiment, the present disclosure provides a method according to the ninth embodiment, wherein the substrate is selected from the group consisting of lenses, filters, windshields, electronic illuminated displays, and solar panels.

In an eleventh embodiment, the present disclosure provides an article made according to the method of any one of the eighth to tenth embodiments.

In a twelfth embodiment, the present disclosure provides a method of making a composition comprising steps:

a) providing a dispersion of organo-modified silica particles and polymer particles in an aqueous continuous liquid phase having an alkaline pH, wherein the organo-modified silica particles have an average particle diameter of 100 nanometers or less: and b) acidifying the dispersion to a pH of less than or equal to 5, thereby causing deposition of at least the organo-modified silica particles onto the polymer particles to provide composite particles dispersed in the aqueous continuous liquid phase, each composite particle comprising:

a polymer core comprising at least one polymer, a silicaceous shell surrounding and disposed on the polymer core, wherein from 3 to 50 percent of silicon atoms in the silicaceous shell are bonded to organic groups via a silicon-carbon covalent bond, and wherein the weight ratio of a total amount of the silica in the composition to the total amount of the at least one polymer is from 0.1 to 19.

In a thirteenth embodiment, the present disclosure provides a method according to the twelfth embodiment, wherein the organic groups comprise at least one of an alkyl group having from 1 to 4 carbon atoms, a chloromethyl group, an epoxyalkyl group having from 1 to 6 carbon atoms, an epoxyalkyleneoxyalkyl group having from 1 to 6 carbon atoms, an alkenyl group having from 1 to 6 carbon atoms, and a combination thereof.

In a fourteenth embodiment, the present disclosure provides a method according to the twelfth or thirteenth embodiment, further comprising contacting the dispersion provided in step a) with a protonated cation exchange resin prior to step b).

In a fifteenth embodiment, the present disclosure provides a method according to the any one of the twelfth to fourteenth embodiments, wherein the dispersion provided in step a) further comprises a water-soluble polymer.

In a sixteenth embodiment, the present disclosure provides a method according to the fifteenth embodiment, wherein the water-soluble polymer is at least partially disposed with the polymer core.

In a seventeenth embodiment, the present disclosure provides a method according to the any one of the twelfth to sixteenth embodiments, further comprising adding to the composition from 1 to 10 percent by weight, based on the total combined weight of the composition, of a hydrolyzable silane represented by the formula:

wherein $R^1$ represents a monovalent organic group; and each $R^2$ independently represents H, an alkyl group having from 1 to 4 carbon atoms, or an acyl group having from 1 to 4 carbon atoms.

In an eighteenth embodiment, the present disclosure provides a method according to the any one of the twelfth to seventeenth embodiments, wherein the composition further comprises at least one metal cation having a charge of at least +2.

In a nineteenth embodiment, the present disclosure provides a method according to the any one of the twelfth to eighteenth embodiments, wherein said at least one metal cation comprises an aluminum cation.

In a twentieth embodiment, the present disclosure provides a composition comprising:

a continuous liquid phase comprising at least 90 percent by weight of water; and organo-modified silica particles dispersed in the aqueous continuous liquid phase, wherein from 3 to 50 percent of silicon atoms in the silicaceous particles are bonded to organic groups via a silicon-carbon covalent bond.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise noted, all chemicals used in the examples can be obtained from general chemical suppliers such as, for example, Sigma-Aldrich Corp., Saint Louis, Mo. In the examples, "wt. %" refers to weight percent, and "mol" refers to mole.

| TABLE OF MATERIALS USED IN THE EXAMPLES | | |
|---|---|---|
| ABBREVIATION | DESCRIPTION | SOURCE |
| IE | AMBERLITE IR 120 H sulfonated polystyrene-type cation exchange resin | Alfa Aesar, Ward Hill, Massachusetts |
| N2326 | NALCO 2326 ammonia-stabilized colloidal silica particle dispersion, 16 wt. % solids, mean particle diameter = 5 nm | Nalco Co., Naperville, Illinois |
| R966 | NEOREZ R-966 aliphatic urethane aqueous emulsion, 33 wt. % solids | DSM NeoResins Inc., Wilmington, Massachusetts |
| A612 | NEOCRYL A-612 acrylic resin aqueous emulsion, 30 wt. % solids | |
| A1049 | NEOCRYL A-1049 acrylic aqueous emulsion 39-41 wt. % solids | |
| R5044 | ROVENE 5044 carboxylated styrene - butadiene (SBR) latex emulsion, 50% solids | Mallard Creek Polymers, Inc., Charlotte, North Carolina |
| 3M1000NF | 3M FAST TACK 1000NF acrylic emulsion, 48-52 wt. % solids | 3M Company, St. Paul, Minnesota |
| PET | MELINEX 618 super clear polyester film, 50 microns thickness | E. I. du Pont de Nemours & Co., Wilmington, Delaware |

Tetramethoxysilane (TMOS), tetraethoxysilane (TEOS), methyltriethoxysilane (MTES), ethyltriethoxysilane (ETES), and vinyltriethoxysilane (VTES) were purchased from Alfa Aesar, Ward Hill, Mass.

3-Glycidoxypropyl trimethoxysilane, (3-acryloxypropyl) trimethoxysilane, chloromethyltriethoxysilane, 5,6-epoxyhexyl triethoxysilane, phenyltriethoxysilane, diethylaminomethyltriethoxysilane, (2-triethoxysilylpropoxy) ethoxysulfolane were purchased from Gelest Inc., Tullytown, Pa.

Ammonium hydroxide solution, nitric acid, phosphoric acid, acetic acid were purchased from EMD Chemicals Inc., Gibbstown, N.J.

n-Butylamine, 3-amino-1-propanol, aluminum nitrate nonahydrate, zinc acetate dehydrate, zirconyl chloride octahydrate, and polyethyleneimine (PEI) (linear, average $M_n$=10,000 g/mol) were purchased from Sigma-Aldrich Co., Saint Louis, Mo.

PEI having an average $M_n$=10000 g/mol was dissolved in deionized (DI) water to obtain 5 wt % aqueous solution before use.

Polyvinyl alcohol (PVA) resin, having an average molecular weight of 20000 g/mol, was obtained from Marubeni Specialty Chemicals Inc., White Plains, N.Y., and was dissolved in deionized water to obtain a 5 wt. % aqueous solution before use.

Polyvinylpyrrolidone (PVP) resins were purchased from TCI America, Portland, Oreg. PVP having an MW range from 40K-360K was dissolved in DI water to obtain 5 wt. % aqueous solution before use. PVP (K 90) had a number average molecular weight of 360,000 g/mol and PVP (K 70) had a number average molecular weight of 220,000 g/mol.

Regular glass slides were obtained from VWR international, West Chester, Pa.

Solar glass substrate, Solite Glass, was obtained by CSG Holding Co. Ltd., China. These glass slides were pretreated by gentle scrubbing with ALCONOX cleanser from VWR International, and subsequently washed thoroughly with deionized (DI) water before use.

Aluminum nitrate aqueous solution was prepared by dissolving $Al(NO_3)_3.9H_2O$ solid into water to obtain a 20 wt. % solution prior to use.

Zinc acetate aqueous solution was prepared by dissolving $Zn(O_2CCH_3)_2.2H_2O$ solid in water to obtain a 20 wt. % solution prior to use.

Zirconyl chloride octahydrate aqueous solution was prepared by dissolving $ZrOCl_2.8H_2O$ solid into water to obtain a 20 wt. % solution prior to use.

Methods:

Method for Preparing Functional Silica Particle Dispersions

In an 8-oz (237 ml) glass jar, 89 grams (g) of DI water and 1 g of 3-amino-1-propanol was mixed homogenously, and then 10 g of TEOS was added. The mixture was vigorously stirred for 1-2 hrs until it become a homogenous clear solution forming a colloidal silica particle dispersion. Then, 2.5-10 wt. % of functional silanes (such as MTES, ETES, VTES, (3-acryloxypropyl)trimethoxysilane, chloromethyltriethoxysilane, 5,6-epoxyhexyltriethoxysilane, phenyltriethoxysilane, etc.) with respect to the total weight of TEOS were added into a 100 g colloidal silica particle dispersion prepared above to prepare various functional silica particle dispersions. The dispersions were stirred for 3-24 hrs before use. The final solutions were filtered through a Whatman Grade 4 filter paper to remove clumps before use when deemed necessary. The final solution had pH value around 10.4±0.2.

Functional silica particle dispersions prepared with ammonium hydroxide solution (28-30%) or n-butylamine were conducted in a similar manner as described above. The final solutions were clear with pH values in a range of 9-11.

Method of Preparing Composite Particle Dispersions—Method I

Into an 8-oz (237 ml) container was placed 45 g of a colloidal silica particle dispersion, prepared as described above, and 4.5 g of R966 latex while the solution was stirred. Then 50.5 grams of DI water was added to dilute the solution. Finally, $HNO_3$ or acetic acid was added dropwise to adjust the solution pH value to 2-4 to obtain the composite particle dispersion having a weight ratio of silica:R966 (i.e., polymer latex)=46.4:53.6. After preparing the composite particle dispersion, 0.5-1.0 gram of 3-glycidoxypropyltrimethoxysilane was added into the composite particle dispersion and the solution was stirred for at least 30 minutes.

In the same manner, composite particle dispersions with different ratios of silica:polymer latex were prepared by adjusting the amounts of colloidal silica particle dispersion and polymer latex.

In some cases, after preparing the composite particle dispersion, 5-10 grams of aluminum nitrate aqueous solution (20 wt. % $Al(NO_3)_3.9H_2O$), zinc acetate aqueous solution (20 wt. % $Zn(O_2CCH_3)_2(H_2O)_2$) or zirconyl chloride aqueous solution (20 wt. % $ZrOCl_2.8H_2O$) was added into the solution before use.

In some cases, 0.5-4 grams of PVP (5 wt. % in water) or PVA (5 wt. % in water) was mixed with the composite particle dispersions.

The exact process used and the composition of the composite particle dispersions for each Example and Comparative Example are reported hereinbelow.

Method of Preparing Composite Particle Dispersions—Method II

Into an 8-oz (236.5 ml) container was placed 75 g of colloidal silica particle dispersion prepared as described above, and 7.5 g of R966 latex while the solution was stirred. Then 17.5 g of DI water was added to dilute the solution. To the mixed solution was added 15-20 g of IE ion-exchange resin, and the solution was stirred for 10-20 min until the pH dropped to 4-5. The ion-exchange resin was removed by filtration. Finally, $HNO_3$ was added to adjust the solution pH value to 2-4 to obtain the composite particle dispersion having a ratio of silica:R966=46.4:53.6. After preparing the composite particle dispersion, 0.5-1.0 gram of 3-glycidoxypropyltrimethoxysilane was added into the composite particle dispersion and the solution was stirred for at least 30 minutes.

In the same manner, composite particle dispersions with different ratios of silica:polymer latex were prepared by adjusting the amounts of colloidal silica and polymer latex.

After preparing the composite particle dispersion, 0.5-1.0 grams of 3-glycidoxypropyltrimethoxysilane was added into the composite particle dispersion, and the solution was stirred for at least 30 minutes.

In some cases, after preparing the composite particle dispersion, 5-10 grams of aluminum nitrate aqueous solution (20 wt. % $Al(NO_3)_3.9H_2O$), zinc acetate aqueous solution (20 wt. % $Zn(O_2CCH_3)_2.2(H_2O)$) or zirconyl chloride aqueous solution (20 wt. % $ZrOCl_2\ 8H_2O$) was added into the solution before use.

In some cases, 0.5-4 grams of PVP (5 wt. % in water) or PVA (5 wt. % in water) was mixed with the composite particle dispersions.

Method of Preparing Composite Particle Dispersions—Method III

Into an 8-oz (237 ml) container was added 83 g of DI water and 7.5 g of R966 latex. To the solution was added 2.0 grams 28-30% aqueous ammonia (or 1.0 gram n-butylamine/3-amino-1-propanol as indicated). The solution was stirred and subsequently was added 7.5 g TEOS and 2.5-10 wt. % of functional silanes (such as MTES, ETES, VTES, (3-acryloxypropyl)trimethoxysilane, chloromethyltriethoxysilane, 5,6-epoxyhexyltriethoxysilane, phenyltriethoxysilane, etc.) with respect to the total weight of TEOS. The solution was stirred for 6-16 hours at room temperature. After hydrolysis, the pH value of the mixed solution was adjusted to 2-4 with nitric acid or acetic acid to obtain the composite particle dispersion having a ratio of R966:silica=53.6:46.4. After preparing the composite particle dispersion, 0.5-1.0 gram of 3-glycidoxypropyltrimethoxysilane was added into the composite particle dispersion and the solution was stirred for at least 30 minutes.

In some cases, after preparing the composite particle dispersion, 5-10 grams of aluminum nitrate aqueous solution (20 wt. % $Al(NO_3)_3 \cdot 9H_2O$), zinc acetate aqueous solution (20 wt. % $Zn(O_2CCH_2)_2 \cdot 2(H_2O)$) or zirconyl chloride aqueous solution (20 wt. % $ZrOCl_2 \; 8H_2O$) was added into the solution before use.

In some cases, 0.5-4 grams of PVP (5 wt. % in water) or PVA (5 wt. % in water) was mixed with the composite particle dispersions.

Method of Preparing Composite Particle Dispersions—Method IV

Into an 8-oz (237 ml) container was added 83 g of DI water and 7.5 g of R966 latex. To the solution was added 2.0 g of 28-30% aqueous ammonia (or 1.0 gram n-butylamine/3-amino-1-propanol as indicated). The solution was stirred and subsequently was added 7.5 gram TEOS and 2.5-10 wt. % of functional silanes (such as MTES, ETES, VTES, (3-acryloxypropyl)trimethoxysilane, chloromethyltriethoxysilane, 5,6-epoxyhexyltriethoxysilane, phenyltriethoxysilane, etc.) with respect to the total weight of TEOS. The solution was stirred for 6-12 hours at room temperature. After hydrolysis, to the mixed solution was added 15-20 g of IE ion-exchange resin, and the solution was stirred for 10-20 min. The ion-exchange resin was removed by filtration and the solution pH was about 4-5. Finally, $HNO_3$ was added to adjust the solution pH value to 2-4 to obtain the composite particle dispersion having a ratio of R966:silica=53.6:46.4. After preparing the composite particle dispersion, 0.5-1.0 g of 3-glycidoxypropyltrimethoxysilane was added into the composite particle dispersion and the solution was stirred for at least 30 minutes.

In some cases, after preparing the composite particle dispersion, 5-10 grams of aluminum nitrate aqueous solution (20 wt. % $Al(NO_3)_3 \cdot 9H_2O$), zinc acetate aqueous solution (20 wt. % $Zn(O_2CCH_2)_2 \cdot 2(H_2O)$) or zirconyl chloride aqueous solution (20 wt. % $ZrOCl_2 \; 8H_2O$) was added into the solution before use.

In some cases, 0.5-4 grams of PVP (5 wt. % in water) or PVA (5 wt. % in water) was mixed with the composite particle dispersions.

Method of Preparing Composite Particle Dispersions—Method V

Into an 8 oz (236.5 ml) container was placed 5.0 grams of R966 latex (33.3%), 86.67 grams of DI water and 8.33 grams of TEOS/MTES or TMOS/MTES mixture (TEOS/MTES or TMOS/MTES ratio was 20/1), while the solution was stirred. The pH of the solution was adjusted using $HNO_3$ or an ion exchange resin to acidic or neutral range (pH 6-8). The amount of silanes and polymer latex to use was determined based on the desired wt. ratio of silica precursor:polymer latex particles in the resulting dispersion. Finally, hydrolysis reaction was allowed to run for sufficient time to obtain the composite particle dispersion.

Method for Coating PET Film and Glass Slide Substrates

Coated samples were prepared by coating the composite particle dispersion solutions for Examples and Comparative Examples described below using a Meyer bar (wire wound rod) or a dip coater. Unless stated otherwise, the coated samples were subjected to 100-140° C. for 5-10 minutes after coating.

Method for Determining Particle Diameter

Dynamic Light Scattering (DLS) was applied for particle size analysis with a Zetasizer Nano ZS at room temperature. For colloidal silica particles and functional silica particles, the samples were prepared by diluting with pH~10 ammonia solution or 3-amino-1-propanol solution. For composite particles, the samples were diluted with pH~2 $HNO_3$ solution containing 5% ethanol. The test conditions are reported below.

Instrument Malvern ZetaSizer Nano ZS
Standard Material: $SiO_2$ (R.I. 1.460_0.100i)
operating Dispersant: $H_2O$/Aqueous solution (R.I. 1.330)
procedure Viscosity: 1.0031 cP at 20° C.
  Cuvette: Disposable Sizing Cuvette DTS0012
  Measurement: Automatic settings, 173° Backscatter measurement angle, three measurements per cell, automatic attenuation, automatic position and general purpose analysis model
  Duke Scientific Standard: 60 nm, Lot #43288

The Z-average diameter was calculated by the methods of cumulants as described by Koppel, D. E. in "Analysis of Macromolecular Polydispersity in Intensity Correlation Spectroscopy: The Method of Cumulants" *J. Chem. Phys.* (1972), 57 (11), pp. 4814-4820. The "Z-average diameter" is the intensity weighted harmonic mean diameter. After determining the Z-average diameter, the silica particle diameter (size) was normalized based on calculated the Z-average diameter for a commercially available silica nanoparticle dispersion (i.e., N2326), which has an average particle diameter of 5 nm.

Method for Static Water Contact Angle (SWCA) Measurement

Static water contact angle measurements were performed on dried (coated) samples using DI water obtained from Millipore Corp., Billerica, Mass. The contact angle analyzer used was a VCA Optima video contact angle analyzer from AST Products Inc., Billerica, Mass. The static contact angle was measured on a sessile drop (5 μL), 30 sec after deposition. The values reported are the average of at least 3 separate measurements.

Method for Transmission, Haze and Gloss Measurement

Total transmission and haze measurements were conducted using a HAZE-GUARD PLUS haze meter purchased from BYK-Gardner USA, Columbia, Md. Gloss measurement was conducted on MICRO-TRI-GLOSS meter purchased from BYK-Gardner USA, Columbia, Md. The values reported are the average of three individual data points.

Method for Soil-Resistance (Carpet Soil) Measurement

Carpet soil mixture (80 g) was combined with mixing beads (1600 g) at a 20:1 wt.:wt. ratio using a paint shaker for 5 minutes in a gallon-sized (about 3.79 liter) can. The carpet soil contained 38.4 weight percent peat moss blend, 17 wt.

% gray Portland cement, 17 wt. % Dixie clay, 17 wt. % filter gel, 1.8 wt. % carbon black, and 8.8 weight percent mineral oil.

Approximately 200 grams portions of soil mixtures were placed into small cans, and coated Example and Comparative Example samples on PET film and glass slides were placed (one sample per can) into cans so that the samples were totally covered. The immersed samples were shaken for 1 minute using a lab shake after which they were removed, and tapped on a hard surface about three times to remove the loosely adhered dirt. The total transmission, gloss and haze of each sample was measured before and after testing by using the methods described above.

Method for Dip Coating and Tempering

In order to obtain single-side coated Solite Glass substrate, the uncoated side was masked with a piece of tape to prevent the coating solution wetting on the surface. Then the substrate was dipped in a coating solution prepared according to the Examples and Comparative Examples described below. After pulling out of the coating solutions, the tapes were carefully removed. The coated samples were dried at room temperature before subjected to a tempering process at 700-750° C. for 1.5~2.5 minutes, and then cooled to room temperature.

Method for Lambda Transmission Measurements

The transmission spectra of blank and coated samples were measured with a Lambda 1050 Perkin-Elmer spectrophotometer from 380 to 1100 nm. The enhancement of transmission by the AR coatings was evaluated by comparing the average difference between spectra for coated Example and Comparative Example samples and blank spectra in the 380~1100 nm range ($\Delta T_{380~1100}$) and are reported below.

Method for Salt Bath Test and Linear Taber Abrasion Test

The coated Example and Comparative Example samples were immersed in a 5 wt. % aqueous NaCl bath for a week, then cleaned with DI water. Those samples were allowed to air dry before transmission and mechanical property measurements. Linear Taber abrasion tests were carried out by using crock cloth patches with 1140 g/cm$^2$ pressure for 400 cycles (using a Model 5750 Taber Abraser, available from Taber Industries, North Tonawanda, N.Y.) on coated areas. Then the tested samples were rinse with DI water for 10 sec to remove the debris from abrasion, and dried. Transmission data were measured after abrasion test, water rinse and drying.

Comparative Examples CEA-CEF

Comparative Examples CEA-CEF were prepared by following the procedure described in the Method for Preparing Colloidal Silica Particle Dispersions-Method V described above. The purpose was to examine the conventional hydrolysis of tetraalkylorthosilicate at acidic or neutral pH conditions (exemplified by TEOS or TMOS) along with polymer latex particles. The tetraalkylorthosilicate, type of polymer latex particles, weight ratio of silica precursor:polymer latex particles, hydrolysis time, pH of the reaction mixture were varied as shown in Table 1. For Comparative Examples CED and CEF, a 5 wt. % solution of PVP (K70) was added to the reaction mixture to result in 10 wt. % PVP with respect to the amount of polymer latex.)

It was noted that conventional hydrolysis of tetraalkylorthosilicate at acidic or neutral pH conditions (exemplified by TEOS or TMOS) along with polymer latex particles caused gelation or precipitation as shown under "Observation" column in Table 1, below. It was concluded that simply using colloidal silica precursors (TEOS or TMOS) to assemble on polymer latex particles to form composite particles would not work.

TABLE 1

| COMPARATIVE EXAMPLE | SILICA PRECURSOR | POLYMER LATEX | SILICA PRECURSOR:POLYMER LATEX, wt.:wt. | WT. % IN SOLUTION | pH (ACID USED) | HYDROLYSIS TIME (HR) | OBSERVATION |
|---|---|---|---|---|---|---|---|
| CEA | None | R966 | 0:100 | 5% in H$_2$O | 6 (HNO$_3$) | N/A | Precipitate |
| CEB | None | R966 | 0:100 | 5% in H$_2$O | 7.5 (IE) | N/A | Precipitate |
| CEC | TEOS:MTES 20:1 | R966 | 83.3:16.7 | 5% in H$_2$O | 7-8 | 14 hrs | Precipitate |
| CED | TEOS:MTES 20:1 | R966 + 10% PVP | 83.3:16.7 | 5% in H$_2$O | 7-8 | 14 hrs | Precipitate |
| CEE | TMOS:MTES 20:1 | R966 | 83.3:16.7 | 5% in H$_2$O | 7-8 | 2 hrs | Gel |
| CEF | TMOS:/MTES 20:1 | R966 + 10% PVP | 83.3:16.7 | 5% in H$_2$O | 7-8 | 2 hrs | Gel |

Preparative Examples PE1-PE10 and Comparative Examples CEG-CEH

Preparative Examples PE1-PE10 were prepared by following the procedure described in the Method for Preparing Functional Silica Particle Dispersions described above. The type of functional silanes added to the TEOS solution was varied as reported in Table 2. Comparative Example H was prepared by following the procedure described in the Method for Preparing Functional Silica Particle Dispersions described above except no functional silane was used.

The resulting colloidal silica particles were analyzed for their particle size using DLS as described in Method for Determining Particle Size described above.

Comparative Example CEG was Nalco 2326. The DLS cumulate fitting results (Z-Average Diameter) for Comparative Example CEG (i.e., Nalco 2326) was 13.73 nm due to solvation layer around particles. Therefore, after determining the Z-Average diameter values for Preparative Examples PE1-PE10 functional silica particles and Comparative Example CEH colloidal silica particles, the silica particle size was normalized based on calculated Z-Average diameter values for Comparative Example CEG silica nanoparticle dispersion (i.e., Nalco 2326) to determine their normalized average particle diameters (sizes). The normalized average particle diameter of Preparative Example 1-10 functional silica particles and Comparative Example H colloidal silica particles determined in this manner are reported in Table 2, below.

TABLE 2

| EXAMPLE | SILICA PRECURSOR | WT. RATIO | Z-AVERAGE DIAMETER, nm | PDI | NORMALIZED PARTICLE DIAMETER, nm |
|---|---|---|---|---|---|
| CEG | Nalco 2326 | — | 13.73 | 0.171 | 5.0 |
| CEH | TEOS | — | 4.03 | 0.230 | 1.47 |
| PE1 | TEOS/MTES | 10:1 | 4.17 | 0.277 | 1.52 |
| PE2 | TEOS/MTES | 20:1 | 4.62 | 0.224 | 1.68 |
| PE3 | TEOS/MTES | 40:1 | 4.65 | 0.281 | 1.69 |
| PE4 | TEOS/ETES | 20:1 | 4.96 | 0.218 | 1.81 |
| PE5 | TEOS/VTES | 20:1 | 4.96 | 0.218 | 1.81 |
| PE6 | TEOS/(3-acryloxypropyl) trimethoxysilane | 20:1 | 6.61 | 0.324 | 2.41 |
| PE7 | TEOS/chloromethyltriethoxysilane | 20:1 | 5.08 | 0.204 | 1.85 |
| PE8 | TEOS/5,6-epoxyhexyl triethoxysilane | 20:1 | 5.86 | 0.286 | 2.13 |
| PE9 | TEOS/phenyltriethoxysilane | 20:1 | 6.03 | 0.275 | 2.20 |
| PE10 | TEOS/diethylaminomethyltriethoxysilane | 20:1 | 5.10 | 0.218 | 1.86 |

Examples 1-25 and Comparative Examples CEI-CEP

Comparative Examples I-P were commercially available polymer latex dispersions without colloidal silica particles as indicated in Table 3.

Examples 1-25 were prepared by following the Method of Preparing Composite Particle Dispersions—Method I or II. The Examples that were prepared by Method of Preparing Composite Particle Dispersions—Method I and acidified to pH 2-4 using nitric acid were further denoted as "A", while those acidified using acetic acid were further denoted as "B". The Examples that were prepared by Method of Preparing Composite Particle Dispersions—Method II and acidified to pH 2-4 using IE ion exchange resin are further denoted as "C".

Examples 1-10 were run using polymer latex R966 and functional silica particle dispersions from Preparative Examples 2-9. The wt. % silica:polymer latex, the acidification process and pH was varied as reported in Table 3.

Examples 11-21 were run in the same manner as Examples 1-10, except that they further included PVA, PVP or PEI. The amount of PVA, PVP or PEI added are reported in Table 3, below as wt. % of polymer latex. Examples that are further denoted as "D" included a further addition of 5 grams of 20 wt. % of $Al(NO_3)_3 \cdot 9H_2O$ salt solution prior to use.

Examples 22-25 were run in the same manner as Examples 1-10, except that the polymer latex was varied as reported in Table 3.

Table 3, summarizes the compositions of the Examples 1-25 and Comparative Examples CEI-CEP and the cumulative fitting results for the resulting composite particles determined using DLS as described in Method for Determining Particle Size described above.

In Table 3, below, * indicates multiple peaks; [a] indicates PVA or PVP solution were mixed after acidification; [b] indicates PVP or PEI solution were mixed with R966 prior to acidification; and [c] indicates PVP solution were mixed with colloidal silica particle dispersion prior to acidification.

TABLE 3

| EXAMPLE | ORGANO-MODIFIED SILICA DISPERSION | POLYMER LATEX | RATIO OF SILICA:LATEX, wt.:wt. | pH | Z-AVERAGE DIAMETER, nm | PDI |
|---|---|---|---|---|---|---|
| CEI | none | R966 | 0:100 | 9.5 | 52.02 | 0.099 |
| CEJ | none | PVP | 0:100 | 10 | 47.36 | 0.228 |
| CEK | none | R966 + 2.5% PVP | 0:100 | 10 | 53.53 | 0.109 |
| CEL | none | R966 + 5% PVP | 0:100 | 10 | 55.50 | 0.121 |
| 1A | PE2 | R966 | 47.8:52.2 | 2 | 185.0 | 0.182 |
| 1B | PE2 | R966 | 47.8:52.2 | 4 | 146.8 | 0.214 |
| 1C | PE2 | R966 | 47.8:52.2 | 2 | 87.62 | 0.117 |
| 2A | PE2 | R966 | 55.0:45.0 | 2 | 129.2 | 0.147 |
| 2B | PE2 | R966 | 55.0:45.0 | 4 | 126.8 | 0.197 |
| 2C | PE2 | R966 | 55.0:45.0 | 2 | 85.78 | 0.124 |
| 3A | PE2 | R966 | 60.4:39.6 | 2 | 106.7 | 0.116 |
| 3B | PE2 | R966 | 60.4:39.6 | 4 | 117.5 | 0.186 |
| 3C | PE2 | R966 | 60.4:39.6 | 2 | 76.88 | 0.085 |
| 4A | PE2 | R966 | 64.7:35.3 | 2 | 94.02 | 0.108 |
| 4B | PE2 | R966 | 64.7:35.3 | 4 | 113.5 | 0.192 |
| 4C | PE2 | R966 | 64.7:35.3 | 2 | 75.63 | 0.089 |
| 5A | PE4 | R966 | 60.3:39.7 | 2 | 118.1 | 0.122 |
| 5C | PE4 | R966 | 60.3:39.7 | 2 | 107.9 | 0.148 |
| 6A | PE5 | R966 | 60.3:39.7 | 2 | 103.8 | 0.097 |
| 6C | PE5 | R966 | 60.3:39.7 | 2 | 103.0 | 0.165 |
| 7A | PE6 | R966 | 60.1:39.9 | 2 | 68.95 | 0.077 |
| 7C | PE6 | R966 | 60.1:39.9 | 2 | 92.93 | 0.140 |
| 8A | PE7 | R966 | 60.2:39.8 | 2 | 110.5 | 0.142 |
| 8C | PE7 | R966 | 60.2:39.8 | 2 | 79.54 | 0.122 |
| 9A | PE8 | R966 | 60.0:40.0 | 2 | 84.14 | 0.109 |
| 9C | PE8 | R966 | 60.0:40.0 | 2 | 101.1 | 0.139 |
| 10A | PE9 | R966 | 60.1:39.9 | 2 | 1637* | 0.276 |

TABLE 3-continued

| EXAMPLE | ORGANO-MODIFIED SILICA DISPERSION | POLYMER LATEX | RATIO OF SILICA:LATEX, wt.:wt. | pH | Z-AVERAGE DIAMETER, nm | PDI |
|---|---|---|---|---|---|---|
| 10C | PE9 | R966 | 60.1:39.9 | 2 | 222.2* | 0.262 |
| 11C | PE2 | R966 + 2.5% PVA[a] | 60.4:39.6 | 2 | 90.93 | 0.089 |
| 11CD | PE2 | R966 + 2.5% PVA[a] | 60.4:39.6 | 2 | 90.99 | 0.095 |
| 12C | PE2 | R966 + 5% PVA[a] | 60.4:39.6 | 2 | 92.33 | 0.104 |
| 12CD | PE2 | R966 + 5% PVA[a] | 60.4:39.6 | 2 | 89.94 | 0.058 |
| 13C | PE2 | R966 + 7.5% PVA[a] | 60.4:39.6 | 2 | 91.79 | 0.112 |
| 13CD | PE2 | R966 + 7.5% PVA[a] | 60.4:39.6 | 2 | 90.93 | 0.095 |
| 14C | PE2 | R966 + 10% PVA[a] | 60.4:39.6 | 2 | 90.60 | 0.106 |
| 14CD | PE2 | R966 + 10% PVA[a] | 60.4:39.6 | 2 | 91.38 | 0.066 |
| 15C | PE2 | R966 + 5% PVP[a] | 60.4:39.6 | 2 | 142.4* | 0.587 |
| 16C | PE2 | R966 + 2.5% PVP[b] | 60.4:39.6 | 2 | 77.50 | 0.133 |
| 16CD | PE2 | R966 + 2.5% PVP[b] | 60.4:39.6 | 2 | 106.5 | 0.226 |
| 17C | PE2 | R966 + 3.75% PVP[b] | 60.4:39.6 | 2 | 73.34 | 0.092 |
| 17CD | PE2 | R966 + 3.75% PVP[b] | 60.4:39.6 | 2 | 169.6 | 0.353 |
| 18C | PE2 | R966 + 5% PVP[b] | 60.4:39.6 | 2 | 91.77 | 0.151 |
| 18CD | PE2 | R966 + 5% PVP[b] | 60.4:39.6 | 2 | 179.9 | 0.372 |
| 19C | PE2 | R966 + 5% PVP[c] | 60.4:39.6 | 2 | 135.1 | 0.436 |
| 19CD | PE2 | R966 + 5% PVP[c] | 60.4:39.6 | 2 | 160.7 | 0.282 |
| 20C | PE2 | R966 + 5% PEI[b] | 60.4:39.6 | 2 | 120.1 | 0.191 |
| 21C | PE10 | R966 + 5% PVP[b] | 60.4:39.6 | 2 | 117.0 | 0.241 |
| CEM | none | A612 | 0:100 | 9.5 | 124.3 | 0.021 |
| CEN | none | A1049 | 0:100 | 9.5 | 141.7 | 0.042 |
| CEO | none | 3M1000NF | 0:100 | 5.5 | 146.0 | 0.005 |
| CEP | none | R5044 | 0:100 | 7.5 | 177.9 | 0.010 |
| 22A | PE2 | A612 | 60.4:39.6 | 2 | 191.8 | 0.344 |
| 22B | PE2 | A612 | 60.4:39.6 | 4 | 316.6 | 0.359 |
| 22C | PE2 | A612 | 60.4:39.6 | 2 | 116.5 | 0.058 |
| 23A | PE2 | A1049 | 60.4:39.6 | 2 | 1228 | 0.285 |
| 23B | PE2 | A1049 | 60.4:39.6 | 4 | 233.4 | 0.125 |
| 23C | PE2 | A1049 | 60.4:39.6 | 2 | 114.6 | 0.033 |
| 24A | PE2 | 3M1000NF | 60.4:39.6 | 2 | 162.8 | 0.038 |
| 24B | PE2 | 3M1000NF | 60.4:39.6 | 4 | 274.0 | 0.042 |
| 24C | PE2 | 3M1000NF | 60.4:39.6 | 2 | 137.8 | 0.020 |
| 25A | PE2 | R5044 | 60.4:39.6 | 2 | precipitate | |
| 25B | PE2 | R5044 | 60.4:39.6 | 4 | 225.4 | 0.046 |
| 25C | PE2 | R5044 | 60.4:39.6 | 2 | 168.3 | 0.021 |

Examples 26C-27C and Comparative Examples CEQ-CER

Comparative Examples CEQ and CER were mixtures of functional silica particle dispersion PE2 and polymer latex with no acidification. Comparative Example CER further contained PVP. The composition and the cumulative fitting results for the Comparative Examples CEQ and CER composite particles are reported in Table 4.

Examples 26C-27C were the composite particles made from acidification (by ion exchange to pH 2) of functional silica particle dispersion from PE2 and polymer latex through self-assembly process. The composition and the cumulative fitting results for the composite particles for Examples 26C-27C are reported in Table 4.

To demonstrate the reversibility nature of the composite particles and process of this disclosure, Example 26C-27C dispersions (having pH of 2) were titrated with ammonia to pH 10, and the cumulative fitting results for the resulting composite particles were measured and reported in Table 4.

From a comparison of the Z-Average diameters for Comparative Example CEQ and Example 26C it was concluded that the acidification to pH 2 led to the formation of composites as indicated by increased Z-Average diameter. However, when Example 26C samples were titrated with ammonia to pH 10, the Z-average diameter decreased indicating that the composite particles dissociated.

Similarly from a comparison of Z-Average diameters of Comparative Example CER and Example 27C, before and after titration to pH 10 using ammonia confirms the reversibility of the composite particles and process of this disclosure.

In Table 4, below, * indicates multiple peaks; and [a] indicates PVP (K70) solution was mixed with colloidal silica particle dispersion prior to acidification.

TABLE 4

| EXAMPLE | COMPOSITION | RATIO OF SILICA:LATEX, wt.:wt. | PROCESS | pH | Z-AVERAGE DIAMETER, NM | PDI |
|---|---|---|---|---|---|---|
| CEQ | PE2 + R966 | 60.4:39.6 | mixing | 10 | 54.10 | 0.036 |
| 26C | PE2 + R966 | 60.4:39.6 | IE | 2 | 85.55 | 0.094 |
| 26C + ammonia | PE2 + R966 | 60.4:39.6 | IE, then add ammonia | 10 | 53.94 | 0.034 |
| CER | PE2 + R966 + 5% PVP[a] | 60.4:39.6 | mixing | 10 | 53.31 | 0.045 |

TABLE 4-continued

| EXAMPLE | COMPOSITION | RATIO OF SILICA:LATEX, wt.:wt. | PROCESS | pH | Z-AVERAGE DIAMETER, NM | PDI |
|---|---|---|---|---|---|---|
| 27C | PE2 + R966 + 5% PVP[a] | 60.4:39.6 | IE | 2 | 722.7* | 0.638 |
| 27C + ammonia | PE2 + R966 + 5% PVP[a] | 60.4:39.6 | IE, then add ammonia | 10 | 53.56 | 0.035 |

Examples 28A-28V and Comparative Examples CES-CET

Comparative Examples CES-CET were bare PET films and bare glass slides, respectively.

Various composite particle dispersions prepared in Examples described above were coated on PET films and glass slides using a Meyer bar (No. 3, nominal wet thickness=6.86 microns), and then cured by drying at room temperature for 5-10 minutes, then placing in an oven at 120° C. for another 5-10 minutes before testing. The SWCA of the coated and cured samples were measured using the Method for Static Water Contact Angle (SWCA) Measurement described above. The SWCA data for each Example 28A-28V and Comparative Examples CES-CET are reported in Table 5.

The transmission, haze and gloss were measured before and after exposing them to carpet soil as described in Method for Soil-Resistance (Carpet Soil) Measurement, and are reported in Table 5.

Examples 30A-30Z

Various composite particle dispersions prepared in Examples described above were dip-coated on solar glass samples, dried at room temperature for 5-10 minutes and then tempered as described in Method for Dip Coating and Tempering.

Composite particle dispersions 1CE and 1CF were prepared in the same manner as described for 1C, above, except that 1.75 grams of 20 wt. % of $Zn(O_2CCH_3)_2 \cdot 2H_2O$ solution for 1CE and 1.75 grams or 20 wt. % $ZrOCl_2 \cdot 8H_2O$ solution for 1CF was added into solution prior to coating.

Lambda transmission measurements were completed as described in Method for Lambda Transmission Measurements, and the data is reported in Table 6.

Samples made from composite particle dispersions 1C, 1CE, 1CF and 14CD were further tested according to the Method for Salt Bath Test and Linear Taber Abrasion Test to demonstrate the mechanical durability of the coating samples. The obtained data is reported in Table 6, below.

TABLE 5

| | | | BEFORE SOILING | | | | AFTER SOILING | | | |
|---|---|---|---|---|---|---|---|---|---|---|
| EXAMPLE | DESCRIPTION | SWCA, degrees | T % | H % | 20° Gloss | 60° Gloss | T % | H % | 20° Gloss | 60° Gloss |
| CES | CES (bare PET) | 71.4 | 90.0 | 1.19 | 200 | 176 | 31.7 | 86.8 | 19.9 | 4.4 |
| 28A | 1A on PET | 59.4 | 96.3 | 0.90 | 77.6 | 115 | 75.2 | 51.2 | 18.7 | 13 |
| 28B | 1C on PET | 58.9 | 96.1 | 0.65 | 82.8 | 127 | 70.2 | 62.1 | 14.1 | 8.3 |
| 28C | 2A on PET | 60.3 | 96.1 | 0.55 | 88.1 | 133 | 73.9 | 54.8 | 33.5 | 26.7 |
| 28D | 2C on PET | 62.9 | 96.3 | 0.52 | 87.4 | 128 | 76.4 | 55.3 | 25.6 | 17.8 |
| 28E | 3A on PET | 56.2 | 95.9 | 0.61 | 84.3 | 122 | 75.3 | 51.3 | 27.6 | 20.4 |
| 28F | 3C on PET | 51.2 | 96.0 | 0.63 | 86 | 128 | 74.8 | 55.4 | 29.2 | 23.5 |
| 28G | 4A on PET | 43.0 | 96.0 | 0.53 | 83.9 | 131 | 75.1 | 52.6 | 33.9 | 28.8 |
| 28H | 4C on PET | 41.0 | 96.0 | 0.70 | 108 | 142 | 77 | 50 | 41.4 | 37.1 |
| 28I | 14CD on PET | 49.1 | 96.3 | 0.64 | 84 | 130 | 77.1 | 51.4 | 18.8 | 12.3 |
| 28J | 17A on PET | 61.0 | 92.1 | 1.84 | 117 | 144 | 87 | 15.4 | 45.6 | 95.2 |
| 28K | 17C on PET | 46.8 | 96.3 | 1.02 | 63 | 121 | 88.5 | 27.6 | 38.3 | 55.6 |
| 28L | 18A on PET | 54.9 | 92.3 | 0.96 | 153 | 130 | 84 | 24.6 | 112 | 72.1 |
| 28M | 18C on PET | 55.8 | 95.5 | 0.75 | 90.7 | 124 | 74.1 | 53.5 | 28.3 | 17.0 |
| 28N | 18CD on PET | 48.8 | 94.7 | 0.86 | 100 | 126 | 92 | 10.4 | 82 | 97.7 |
| CET | CET (bare glass) | 18.9 | 93.0 | 2.26 | 164 | 151 | 75.1 | 50.9 | 61.6 | 29.4 |
| 28O | 3A on glass | 36.4 | 94.6 | 2.91 | 122 | 134 | 78.5 | 49.7 | 46.2 | 26.9 |
| 28P | 3C on glass | 28.5 | 94.5 | 0.14 | 136 | 147 | 83.4 | 30.8 | 77.3 | 56.9 |
| 28Q | 14CD on glass | 16.5 | 94.3 | 1.61 | 104 | 129 | 88.4 | 22.6 | 75.6 | 73.2 |
| 28R | 17A on PET | 49.4 | 94 | 2.66 | 136 | 134 | 70 | 57.7 | 52.8 | 26.9 |
| 28S | 17C on PET | 28.5 | 94.4 | 0.67 | 128 | 142 | 91.3 | 9.22 | 102 | 100 |
| 28T | 18A on PET | 51.1 | 93.5 | 1.69 | 123 | 133 | 78.6 | 40.2 | 36.1 | 15.9 |
| 28U | 18C on PET | 40.2 | 94.2 | 0.34 | 140 | 148 | 85.2 | 24.8 | 84.5 | 60.4 |
| 28V | 18CD on PET | 31.1 | 94 | 0.75 | 136 | 142 | 74.1 | 52.4 | 43.3 | 22.1 |

Example 29C

Example 29C composite particle dispersions were prepared in the same manner as described for 1C above except that (2-triethoxysilylpropoxy)ethoxysulfolane was used to prepare silica particle followed by the Method for Preparing of Functional Silica Particle Dispersions-Method II.

TABLE 6

| EXAMPLE | MODIFIED COMPOSITE PARTICLE DISPERSION | $\Delta T_{380-1100}$, % | SALT BATH (1 week) | LINEAR ABRASION |
|---|---|---|---|---|
| 30A | 1AD | 2.70 | | |
| 30B | 1C | 2.76 | 2.54 | 2.44 |

TABLE 6-continued

| EXAMPLE | MODIFIED COMPOSITE PARTICLE DISPERSION | $\Delta T_{380-1100}$, % | SALT BATH (1 week) | LINEAR ABRASION |
|---|---|---|---|---|
| 30C | 1CD | 2.76 | | |
| 30D | 1CE | 2.73 | 2.72 | 2.67 |
| 30E | 1CF | 2.10 | 2.07 | 1.98 |
| 30F | 2CD | 2.70 | | |
| 30G | 3AD | 2.66 | | |
| 30H | 3CD | 2.68 | | |
| 30I | 4AD | 2.67 | | |
| 30J | 4CD | 2.73 | | |
| 30K | 5CD | 2.69 | | |
| 30L | 6CD | 2.73 | | |
| 30M | 7CD | 2.57 | | |
| 30N | 8CD | 2.70 | | |
| 30O | 9CD | 2.60 | | |
| 30P | 10CD | 2.54 | | |
| 30Q | 14CD | 2.82 | 2.84 | 2.72 |
| 30R | 15CD | 2.74 | | |
| 30S | 18CD | 2.95 | | |
| 30T | 20C | 2.92 | | |
| 30U | 21C | 2.87 | | |
| 30V | 22CD | 2.56 | | |
| 30W | 23CD | 2.73 | | |
| 30X | 24CD | 2.21 | | |
| 30Y | 25CD | 2.32 | | |
| 30Z | 29C | 2.79 | | |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising:
an aqueous continuous liquid phase;
composite particles dispersed in the aqueous continuous liquid phase, each composite particle comprising:
a polymer core comprising at least one polymer,
a siliceous shell surrounding and disposed on the polymer core, wherein from 3 to 50 percent of silicon atoms in the siliceous shell are bonded to respective organic groups via a silicon-carbon covalent bond, and wherein the weight ratio of a total amount of the silica in the composition to the total amount of the at least one polymer is from 0.1 to 19, and
a water-soluble polymer, wherein the water-soluble polymer is at least partially disposed within the polymer core, and
wherein the composition has a pH of 5 or less.

2. The composition of claim 1, wherein the organic groups comprise at least one of an alkyl group having from 1 to 4 carbon atoms, a chloromethyl group, an epoxyalkyl group having from 1 to 6 carbon atoms, an epoxyalkyleneoxyalkyl group having from 1 to 6 carbon atoms, an alkenyl group having from 1 to 6 carbon atoms, and a combination thereof.

3. The composition of claim 1, wherein the composition further comprises from 1 to 10 percent by weight of a hydrolyzable silane represented by the formula:

$$R^1Si(OR^2)_3$$

wherein
$R^1$ represents a monovalent organic group; and
each $R^2$ independently represents H, an alkyl group having from 1 to 4 carbon atoms, or an acyl group having from 1 to 4 carbon atoms.

4. The composition of claim 1, wherein the composition further comprises at least one metal cation having a charge of at least +2.

5. The composition of claim 4, wherein said at least one metal cation comprises an aluminum cation.

6. A method of making an article, the method comprising applying the composition of claim 1, to a surface of a substrate, and at least partially drying the composition.

7. The method of claim 6, further comprising heating the at least partially dried composition to a temperature sufficient to burn out the polymer cores of at least a portion of the composite particles, leaving behind the corresponding hollow silica shells.

8. The method of claim 7, wherein the substrate is selected from the group consisting of lenses, filters, windshields, electronic illuminated displays, and solar panels.

9. An article made by the method of claim 6.

* * * * *